Nov. 16, 1965   E. LOWE ETAL   3,217,421
METHOD AND APPARATUS FOR TREATING FOODS WITH GASEOUS MEDIA
Filed Sept. 18, 1962   2 Sheets-Sheet 1

E. LOWE, E.L. DURKEE &
W.E. HAMILTON.
INVENTORS.

BY R. Hoffman
ATTORNEY.

Nov. 16, 1965   E. LOWE ETAL   3,217,421
METHOD AND APPARATUS FOR TREATING FOODS WITH GASEOUS MEDIA
Filed Sept. 18, 1962   2 Sheets-Sheet 2

E. LOWE, E.L. DURKEE &
W.E. HAMILTON
INVENTORS

BY R. Hoffman
ATTORNEY

3,217,421
METHOD AND APPARATUS FOR TREATING FOODS WITH GASEOUS MEDIA

Edison Lowe, El Cerrito, Everett L. Durkee, El Sobrante, and Walter E. Hamilton, El Cerrito, Calif., assignors to the United States of America as represented by the Secretary of Agriculture
Filed Sept. 18, 1962, Ser. No. 224,573
3 Claims. (Cl. 34—20)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to method and apparatus for treating particulate material, typically food products, with gaseous media. The treatment effected by the invention may be, for example, dehydration, cooling, refrigerating, freezing, blanching, cooking, impregnation with flavorings and/or preservatives, smoking, or combinations of such treatments as is determined by the composition and/or physical condition of the gaseous medium applied to the material under treatment.

A particular object of the invention concerns application of our novel method and apparatus in connection with the deposition of protective coatings on food products. More particularly, this object of the invention is concerned with the provision of novel methods and devices for cooling materials—typically raisins—which have been coated with a hot liquid material such as molten wax. The application of the invention in this specific connection will be emphasized in the following description without any intention to limit the invention thereto. Further objects and advantages of the invention will be evident from the following description wherein parts and percentages are by weight unless otherwise specified.

Figure 1:
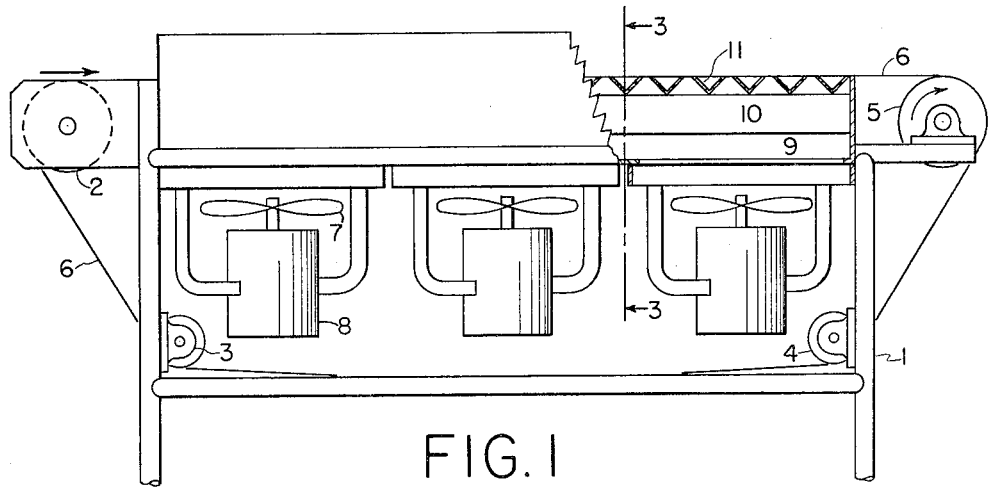
Figure 2:
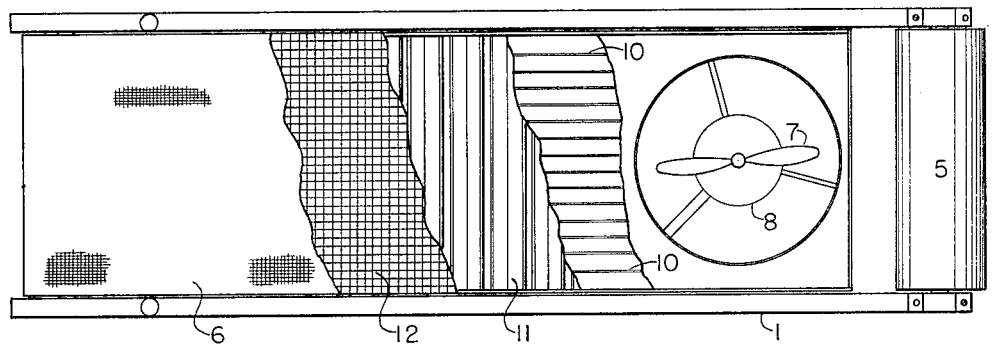
Figure 3:
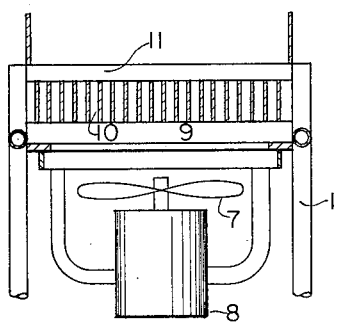
Figure 4:
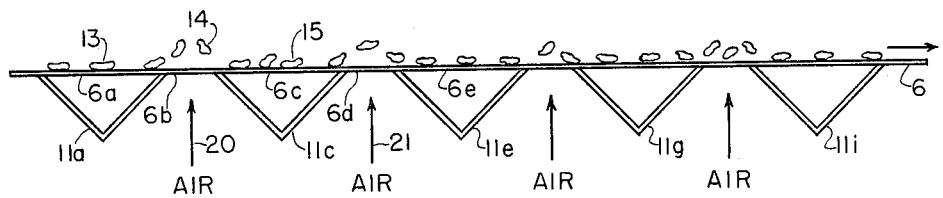
Figure 5:
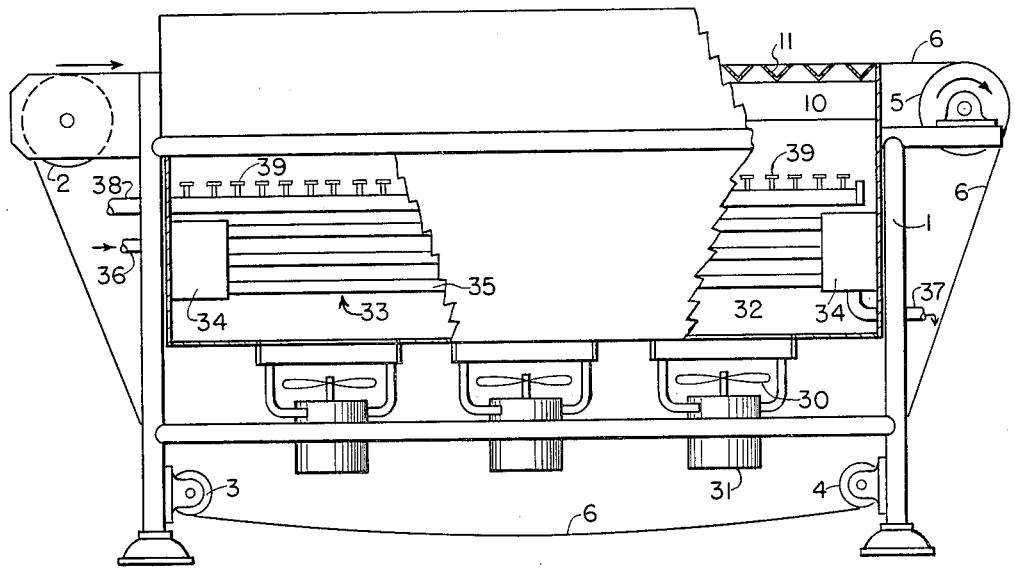

In the annexed drawings, FIGS. 1 to 4, depict a form of cooling apparatus in accordance with the invention. FIG. 1 depicts the device in elevation; FIG. 2 is a plan view. In both these figures, parts have been cut away for a better understanding of the construction. FIG. 3 is a cross-section taken on plane 3—3 of FIG. 1. FIG. 4 is an enlarged schematic view illustrating the mode of operation of the device of FIGS. 1 to 3. FIG. 5 depicts, in elevation, a modified form of the device equipped with supplemental equipment for versatile use. In this figure, parts have been cut away for illustrative purposes.

In our Patent No. 3,046,143, issued July 24, 1962, and our copending patent application, Ser. No. 128,618, filed June 29, 1961, we have disclosed a novel system for coating food products, typically raisins. Briefly described, this system involves immersing the raisins in a pool of hot molten wax while applying agitation—typically attained by pumping the raisins and molten wax through a coil of pipe. The mixture of raisins and molten wax is then separated and the wax-coated raisins while still hot are subjected to treatment in a centrifugal device wherein the raisins are subjected to impingement against a perforated surface to dislodge excess wax and so reduce the thickness of the wax coating to a desirable level, for example, 2 to 2.5% by weight of the fruit. The product is then cooled and is ready for packaging and sale.

It has been observed that in applying the procedure described above, a problem is encountered in that during the cooling period, the raisins tend to adhere to one another, forming clusters cemented together by the hardened wax. Such products are, of course, undesirable as the trade demands coated raisins which are separate from one another.

By applying the invention described herein the problem outlined above is completely alleviated. Thus by application of the teachings of the invention, the hot waxed raisins are cooled in such a way that they remain separate. An important item in the process of the invention is that the raisins are subjected to cooling while fluidized, that is, suspended in an air stream. During this suspension, the raisins are moved about randomly and individual raisins cannot adhere as their wax coatings congeal. Coupled with this desirable mode of cooling is an arrangement of providing *spaced* air streams which have the benefit of providing traction between the raisins and a perforated carrier so that the raisins can be continuously traversed through the cooling region. The manner by which these improved results are obtained will be evident from the following explanation:

Referring to the annexed drawing, particularly FIG. 1, the cooler includes a frame 1 on which is journalled rollers 2, 3, 4, and 5. Of these, 2, 3, and 4 are idlers whereas roller 5 is driven by conventional means in the direction designated by the arrow. A mesh belt 6 is mounted on these rollers whereby it is traversed in the indicated direction. In operation the hot, wax-coated raisins are deposited at the feed end of the device, near roller 2, and are transported by belt 6 to the opposite end of the device, the cooled product being delivered at the exit end of the device, adjacent roller 5.

Air for cooling the hot raisins is provided by a series of fans 7, each provided with an electric motor 8. These fans force air from the atmosphere upwardly into the plenum chamber 9 below the upper flight of belt 6. From the plenum chamber 9 the air moves upwardly, past spacers 10. These spacers are a series of plates running longitudinally of the device which minimize swirling of the air stream as it moves upwardly. As the air stream rises above the level of spacers 10 it is deflected by V-shaped louvers 11 into a series of streams, spaced from one another by the width of each louver 11. (The provision of these louvers has a critical bearing on the invention as will be explained hereinafter.) These spaced air streams then pass through belt 6 whereby they contact the raisins and lift them off the belt and subject them to cooling action. During this lifting action the raisins are jostled randomly against one another so that formation of cemented clusters cannot take place. Also, any preformed aggregates of raisins are broken up into individual raisins by the jostling action. It is evident that the construction of fans 7 and their rate of rotation is correlated with other parameters of the system so that they supply air at high enough velocity to lift the raisins off the belt in the areas between louvers 11.

Referring to FIG. 2, the cooler preferably includes a wire mesh screen 12 positioned over louvers 11 and under belt 6. This screen serves to support the belt and to effect a more uniform distribution of air up through the conveyor belt.

Reference is now made to FIG. 4 which illustrates the action of the spaced air streams. For a better understanding of the system, belt 6 is divided into a series of zones 6–a, 6–b, etc.; the individual louvers 11 are designated 11a, 11c, 11e, etc.

Consider first the portion of the belt, 6a, over louver 11a. Since this louver cuts off the air flow, the raisins 13 ride on the belt. However, with continued movement, the raisins encounter air stream 20 and are thereby lifted off the belt and while suspended in air the raisins, now designated as 14, are subjected to intensive cooling action. Since raisins 14 are suspended in air they would not move to the right but for the fact that a new batch of raisins moving into position over air stream 20 jostle raisins 14 to their new position, 15, resting on the belt 6c. As these raisins approach air stream 21 they are again lifted off the belt and subjected to intensive cooling while suspended in the air stream, being then jostled to the quiescent area 6e. This sequence of events is repeated until eventually the cooled raisins are delivered to the exit end of the belt. The importance of the system of the invention is that it achieves these results: In the first place, the raisins are subjected to the intensive cooling effect of an air stream while actually suspended in the air stream so that clumping cannot take place. Secondly, by spacing the air streams, the raisins are kept moving in the desired direction. That is, suspended raisins are jostled by following raisins as they approach the air stream and this forces the first batch of raisins out of the air stream whereby they ride the belt to the next air stream, being then in turn lifted and jostling a previously-lifted batch of raisins forward, etc. Thus in sum, although the present device utilizes a technique of air-suspension cooling, it does so without interfering with forward progression of the raisins. In this connection, it might be observed that if louvers 11 were to be removed from the device, it would be wholly inoperative; the raisins would be suspended over the belt and the belt would uselessly traverse under them without being able to transport the raisins through the system.

Although the invention is of particular advantage in cooling hot, wax-coated raisins, it is not limited to this subject but may be applied in all kinds of operations which involve contact of gas with particulate material, especially materials wherein the individual particles tend to adhere to another when treated in conventional manner. Typical applications of the invention are described below:

A typical application of the invention involves its use in cooling food products which have been coated with wax or other protective materials. Typical examples of food products are figs; prunes; dates; dried cherries; dried apples; dried apricots; candied fruit; nuts; meats in piece form; pellets or tablets of compressed dried foods such as dried eggs, dried milk, dried soup, dried fruit juices; candies and confections, etc. Moreover, although the invention is of particular advantage in coating foods with beeswax, it is evident that the invention may be applied in connection with other coating materials, particularly those which are normally solids and which form liquids when heated. Thus, for example, the coating material may be carnauba wax, candelilla wax, paraffin, edible fats, hydrogenated fats or oils, sugar syrups or solutions, chocolate, icing or frosting compositions, etc. These materials may be used singly or in admixture. Thus for example, a relatively brittle wax may be admixed with a fat, lecithin, acetylated glyceride, or other plasticizer to obtain a more flexible film coating. A typical coating composition of this type contains 40% beeswax and 60% of a commercial acetylated glyceride prepared from hydrogenated lard, being primarily diacetylated monoglycerides of hydrogenated lard fatty acids. Coatings for confectionery items or nuts may be compounded in known manner from such ingredients as sugar, corn syrup or solids, edible fat, starch, chocolate, natural or artificial flavorings, coloring material, and the like.

Another aspect of the invention concerns application of the described system for dehydrating materials, that is, to evaporate moisture from particulate material such as fruits, vegetables, meats, nuts, cereal grains, etc. In such dehydration applications, the same system as described above is employed with the exception that conventional air heaters are supplied so that fans 7 direct hot air or other hot gas suitable for dehydrating purposes upwardly toward belt 6. The dehydration effect can further be enhanced by supplying radiant heaters above belt 6 to direct their rays onto the material on the belt.

Another application of the invention is in the freezing of food products such as fruits, vegetables, meats, fish, etc. In this case conventional refrigeration equipment is supplied so that fans 7 deliver air at a temperature low enough to freeze the particles on the belt. Moreover, the gaseous medium need not necessarily be air and one can use any gas such as carbon dioxide, trichloromonofluoromethane, trichlorotrifluoroethane, etc., at the desired subfreezing temperature. Since in this application of the invention the food particles are frozen while suspended in a blast of gas at sub-freezing temperature, there is little if any tendency for the particles to freeze together as they would be if frozen while in a static condition. Thus products frozen in accordance with the invention remain separate—an especially desirable property for packaging or dispensing products.

A further aspect of the invention lies in its use in cooking or blanching of food products, typically, fruits, vegetables, meats, cereal grains, and the like. A related application is its use in rehydrating dried products such as dried raisins, apricots, figs, prunes, dates, etc. In such applications the system is modified by addition of conventional components so that the cooling air streams are replaced by streams of steam, mixtures of steam and hot air, or other hot—preferably humid—gas or vapor. A typical adaptation of the device of FIGS. 1, 2, and 3 to this use involves delivering steam into plenum chamber 9 at such a rate that the mixture of air and steam rising through louvers 11 has a temperature sufficiently high—for example, 180–212° F.—to effect desired blanching, cooking, or rehydration of the material as it is conveyed on belt 6.

An additional aspect of the invention concerns the use of the device to treat particulate materials with various chemical agents. For example, in the processing of fruits and vegetables it is often desired to impregnate the food particles with agents which inhibit enzyme activity; agents which inhibit browning; agents which inhibit rancidification of fat components in the food; flavoring agents; preservative agents; and so forth. In such applications, the agent in question is incorporated into the gas stream entering plenum chamber 9. Examples of agents which may be so employed are: sulphur dioxide to inhibit browning of the food particles; butylated hydroxy-anisole, propyl gallate, or other volatile organic fat-stabilizing antioxidant to minimize rancidification of fat constituents in the food particles; wood smoke, pyroligneous acid, acetic acid, etc., to act as flavoring and preserving agents; lemon oil, orange oil, cinnamon oil, or other volatile essential oils or fruit essences in order to impart desired flavors to the food particles.

In any of the diverse applications of the device of this invention, the gaseous medium which contacts the particles on belt 6 need not necessarily be entirely in the gaseous state. Thus the medium may consist of a major proportion of a gaseous substance having suspended in it a minor proportion of minute droplets of liquid material such as water; refrigerant (liquid trichloromonochloromethane, liquid trifluorotrichloroethane, etc.); sulphurous acid solution; acetic acid; organic antioxidant, flavoring substance; and so forth.

Reference is now made to FIG. 5 which discloses a modified form of the apparatus, suitable for versatile application. The parts of this embodiment bearing like reference numerals are as described in connection with the embodiment of FIGS. 1 to 3. The device of FIG. 5 includes supplementary equipment by which the character of the gas applied to the material on belt 6 may be changed at will. Fans 30 driven by motors 31 are mounted in the bottom wall of plenum chamber 32. These fans draw air into the chamber 32, from which it is forced upwardly past a heat exchanger 33, provided with end chests 34 and tubes 35. A suitable heating or cooling medium is circulated through exchanger 33, fresh medium entering pipe 36 and the spent medium leaving via drain pipe 37. By this means the air supply is heated to the desired high temperature for dehydration of material or cooled to the desired low temperature for freezing of material. A manifold pipe 38 equipped with nozzles 39 is provided for introduction into the air stream of a desired agent. In cooking, blanching, or rehydrating materials, manifold 33 is supplied with steam in conjunction with heating of the air stream by exchanger 33. In the event that the material is to be treated with such agents as antioxidants, preservatives, flavoring agents, anti-browning agents, etc., these are sprayed into the air stream via manifold 38 and nozzles 39. The air stream, modified in its physical condition and/or composition, then flows past spacers 10 and louvers 11, acting upon the material on belt 6 as described above. With this versatile form of apparatus, materials of all kinds can be subjected to any selected operation such as dehydration, cooling, freezing, cooking, blanching, rehydration, application of chemical preservatives or flavoring agents, etc. In addition to this versatile character, the invention yields the advantages of efficient, continuous operation and with a minimum of clumping or adherence of individual particles being treated.

Having thus described the invention, what is claimed is:

1. A method of cooling hot, wax-coated raisins with a minimum of clumping which comprises depositing the raisins on a perforated carrier, transporting the raisins through a cooling zone, and in said zone subjecting the raisins to repeated alternate treatments of (a) quiescent resting on the carrier and (b) suspension in an air stream directed upwardly through the carrier, said alternate treatments (a) and (b) being continued until the raisins are cooled and the wax coating thereon is congealed.

2. A method of cooling hot, wax-coated raisins with a minimum of clumping which comprises depositing the raisins on a perforated carrier, transporting the raisins on said carrier through a cooling region, within the cooling region applying upwardly directed streams of air in narrow, spaced zones with areas of quiescence between said zones whereby the raisins are subjected to repeated, alternate treatments of (a) suspension in air when over the said spaced air streams and (b) resting on the carrier when in the said areas of quiescence, the application of air streams in the aforesaid manner being continued until the raisins are cooled and the wax coating thereon is congealed.

3. A device for cooling hot- wax-coated raisins with a minimum of clumping, which comprises a perforated belt for carrying the raisins to be cooled, means for traversing the belt, an elongated plenum chamber beneath the belt for delivering an upwardly-directed draft of cooling air, a series of baffles beneath the belt and interposed in the path of said draft of air, each of said baffles extending across the width of the belt and being spaced from one another lengthwise of the belt, said baffles in the aggregate providing a series of narrow, transversely-extending, longitudinally-spaced slots for passage of air from said plenum chamber to said belt, means for forcing cooling air into said plenum chamber and upwardly through said belt and said slots at a velocity sufficient to suspend raisins when over said slots whereby the raisins are subjected to repeated alternate treatments of (a) suspension in the air stream when over a slot and (b) quiescent resting on the belt when over a baffle.

References Cited by the Examiner

UNITED STATES PATENTS

| | | | |
|---|---|---|---|
| 1,778,318 | 10/1930 | Haas | 34—57 |
| 2,249,152 | 7/1941 | Marshall | 34—10 |
| 2,252,814 | 8/1941 | Perkins | 34—232 |
| 2,287,217 | 6/1942 | Wright | 34—231 |
| 2,308,508 | 1/1943 | Harrington | 34—232 |
| 2,666,711 | 1/1954 | Crosset | 34—236 |
| 2,862,308 | 12/1958 | Meredith | 34—236 |

NORMAN YUDKOFF, *Primary Examiner.*